(12) United States Patent
Senneff et al.

(10) Patent No.: US 8,131,432 B2
(45) Date of Patent: Mar. 6, 2012

(54) METHOD AND SYSTEM FOR MANAGING THE TURNING OF A VEHICLE

(75) Inventors: Aaron Matthew Senneff, Ankeny, IA (US); Brandon G. Leiran, Grimes, IA (US); Kevin A. Reigeluth, West Des Moines, IA (US)

(73) Assignee: Deere & Company, Moline, IL (US)

( * ) Notice: Subject to any disclaimer, the term of this patent is extended or adjusted under 35 U.S.C. 154(b) by 1044 days.

(21) Appl. No.: 12/038,040

(22) Filed: Feb. 27, 2008

(65) Prior Publication Data

US 2009/0216406 A1    Aug. 27, 2009

(51) Int. Cl.
*A01B 69/00* (2006.01)
*G01C 21/00* (2006.01)
*G06F 19/00* (2011.01)

(52) U.S. Cl. ............... 701/50; 701/23; 701/26; 701/41; 701/201; 701/210; 701/211; 701/213

(58) Field of Classification Search .............. 701/23, 701/24, 25, 26, 27, 28, 41, 42, 44, 50, 201, 701/202, 210, 211, 213
See application file for complete search history.

(56) References Cited

U.S. PATENT DOCUMENTS

| | | |
|---|---|---|
| 3,468,379 A | 9/1969 | Rushing et al. |
| 3,606,933 A | 9/1971 | Rushing et al. |
| 4,515,221 A | 5/1985 | Van der Lely |
| 4,518,044 A | 5/1985 | Wiegardt et al. |
| 4,626,993 A | 12/1986 | Okuyama et al. |
| 5,543,802 A | 8/1996 | Villevieille et al. |
| 5,558,163 A | 9/1996 | Hollstein |
| 5,606,850 A | 3/1997 | Nakamura |
| 5,704,546 A | 1/1998 | Henderson et al. |
| 5,899,950 A | 5/1999 | Milender et al. |
| 5,961,573 A | 10/1999 | Hale et al. |
| 5,978,723 A | 11/1999 | Hale et al. |
| 5,991,894 A | 11/1999 | Gudat et al. |
| 6,085,134 A | 7/2000 | Adam |
| 6,119,069 A | 9/2000 | McCauley |
| 6,128,574 A | 10/2000 | Diekhans |
| 6,141,614 A | 10/2000 | Janzen et al. |

(Continued)

FOREIGN PATENT DOCUMENTS

DE    102005008105    8/2006

OTHER PUBLICATIONS

Harringa, Emily, Farming the Easy Way. Professional Surveyor Magazine. Mar. 2007.

(Continued)

*Primary Examiner* — Kevin Hurley
*Assistant Examiner* — Marc Scharich

(57) ABSTRACT

A method and system for managing the turning of a vehicle comprises establishing a boundary of a work area. A location-determining receiver determines an observed position and velocity of the vehicle in the work area. An estimator estimates a first duration from an observed time when the vehicle will intercept the boundary based on determined position and velocity of the vehicle. An alert generator generates an alert during a second duration from the observed time. The second duration is less than or approximately equal to the first duration. An operator interface allows an operator to enter a command to control a path of the vehicle prior to or at the boundary.

19 Claims, 11 Drawing Sheets

U.S. PATENT DOCUMENTS

| | | |
|---|---|---|
| 6,236,924 B1 | 5/2001 | Motz et al. |
| 6,266,595 B1 | 7/2001 | Greatline et al. |
| 6,336,051 B1 | 1/2002 | Pangels et al. |
| 6,345,231 B2 | 2/2002 | Quincke |
| 6,463,374 B1 | 10/2002 | Keller et al. |
| 6,681,551 B1 | 1/2004 | Sheidler et al. |
| 6,907,336 B2 | 6/2005 | Gray et al. |
| 6,934,615 B2 | 8/2005 | Flann et al. |
| 6,990,399 B2 | 1/2006 | Hrazdera et al. |
| 7,010,425 B2 | 3/2006 | Gray et al. |
| 7,079,943 B2 | 7/2006 | Flann et al. |
| 7,110,881 B2 | 9/2006 | Gray et al. |
| 7,162,348 B2 | 1/2007 | McClure et al. |
| 7,216,033 B2 | 5/2007 | Flann et al. |
| 7,228,214 B2 | 6/2007 | Flann et al. |
| 7,451,030 B2 | 11/2008 | Eglington et al. |
| 7,502,678 B2 | 3/2009 | Diekhans et al. |
| 7,747,370 B2 * | 6/2010 | Dix ................................ 701/50 |
| 2003/0187560 A1 | 10/2003 | Keller et al. |
| 2003/0208319 A1 | 11/2003 | Ell et al. |
| 2004/0158355 A1 | 8/2004 | Holmqvist et al. |
| 2004/0193348 A1 | 9/2004 | Gray et al. |
| 2004/0193349 A1 | 9/2004 | Flann et al. |
| 2004/0217869 A1 | 11/2004 | Bouchard et al. |
| 2005/0075785 A1 | 4/2005 | Gray et al. |
| 2005/0273253 A1 | 12/2005 | Diekhans et al. |
| 2006/0025894 A1 | 2/2006 | O'Connor et al. |
| 2006/0064222 A1 | 3/2006 | Palmer |
| 2006/0142913 A1 | 6/2006 | Coffee et al. |
| 2006/0200294 A1 | 9/2006 | Scheufler et al. |
| 2006/0237200 A1 | 10/2006 | Unruh et al. |
| 2007/0186530 A1 | 8/2007 | Meier et al. |

OTHER PUBLICATIONS

"Science fiction becomes farming fact." Profi Electronics, Precision Farming Event 2007. pp. 36-38, profi May 2007. Website: www.profi.co.uk.

* cited by examiner

METHOD AND SYSTEM FOR MANAGING THE TURNING OF A VEHICLE

FIELD OF THE INVENTION

This invention relates to a method and system for managing the turning of a vehicle.

BACKGROUND OF THE INVENTION

Commercially available guidance systems may use Global Positioning Systems (GPS) to guide vehicles within a work area or field. For example, an agricultural vehicle may be equipped with a guidance system to facilitate the alignment of different paths into a parallel series of paths with minimal overlap between adjacent paths. At the current time, it is typical for guidance systems to rely upon the operator of the vehicle to execute turns manually at the end of rows (e.g., in the headlands of a field). Accordingly, there is a need to manage the turning of a vehicle at the end of rows in an efficient, safe and reliable manner.

SUMMARY OF THE INVENTION

A method and system for managing the turning of a vehicle comprises establishing a boundary of a work area. A location-determining receiver determines an observed position and velocity of the vehicle in the work area. An estimator estimates a first duration from an observed time (e.g., a current time) when the vehicle will intercept the boundary based on determined position and velocity of the vehicle. An alert generator generates an alert during a second duration from the observed time. The second duration is less than or approximately equal to the first duration. An operator interface allows an operator to enter a command to control a path of the vehicle prior to or at the boundary during a control time window.

DESCRIPTION OF THE PREFERRED EMBODIMENT

Figure 1:
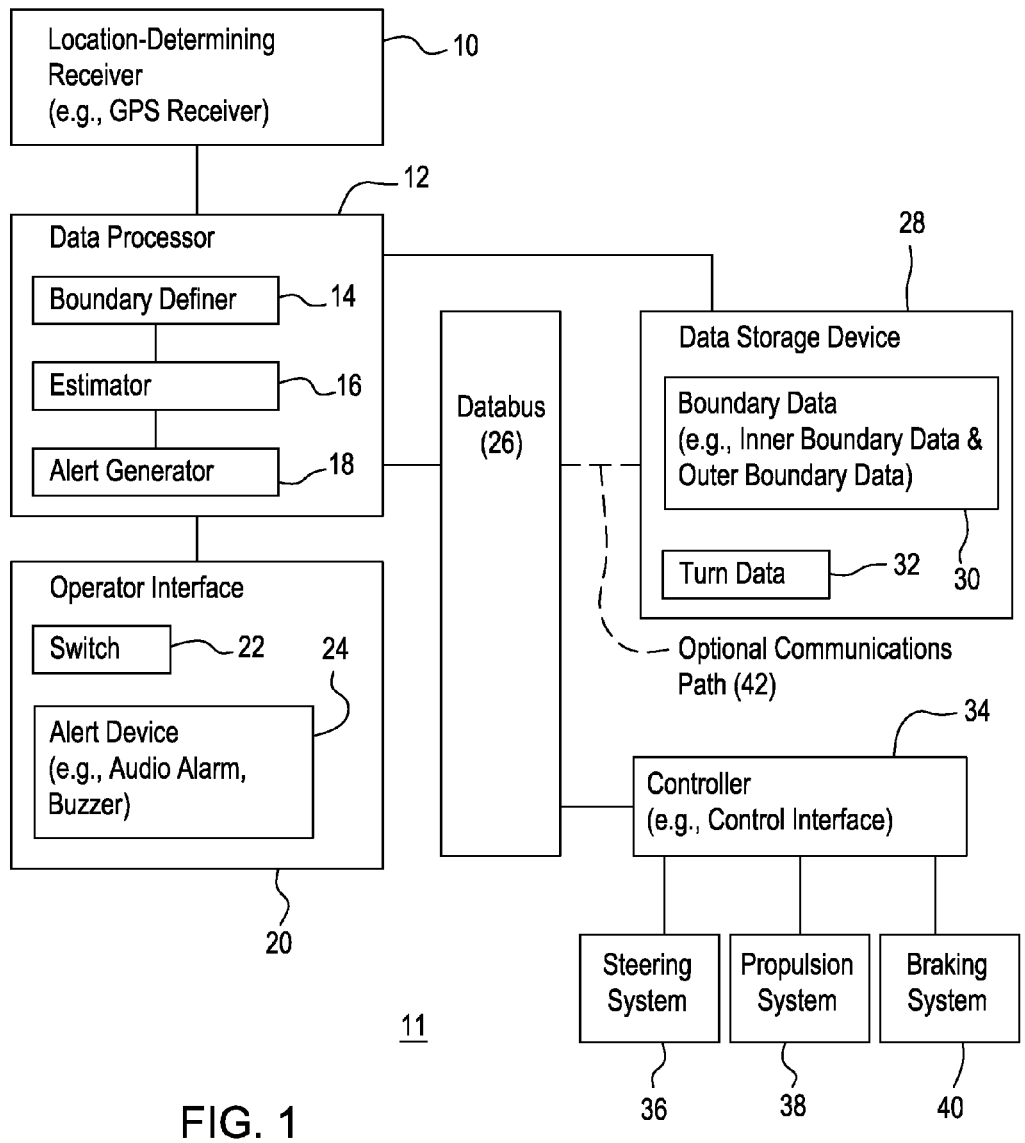
FIG. 1 is a block diagram of one embodiment of a system for managing the turning of a vehicle.

In accordance with one embodiment and referring to FIG. 1, a management system 11 for managing the turning of a vehicle comprises a location-determining receiver 10 coupled to a data processor 12. In turn, the data processor 12 is a capable of communicating with one or more of the following: an operator interface 20, a data bus 26, a data storage device 28 and a controller 34. The controller 34 is configured to communicate with a steering system 36, a propulsion system 38 and a braking system 40.

The lines that are interconnecting the foregoing devices in the management system 11 may be physical data paths, logical data paths, or both. Physical data paths are defined by transmission lines or data buses. Logical data paths may comprise logical or virtual communications that take place within software or between software modules, or communications that occur over one or more data channels (e.g., time division multiplex channels).

The dotted line between the data bus 26 and the data storage device 28 indicates an optional communications path 42 between the data bus 26 and the data storage device 28. The optional communications path 42 may be used to support parallel processing or distributed processing of multiple tasks. For example, the data processor 12 or estimator 16 may estimate the relative position of the vehicle with respect to a boundary and may generate an appropriate alarm based on proximity of the vehicle to the boundary. Meanwhile, the controller 34 may generate (e.g., independently) control signals or control data for executing one or more turns of the vehicle, for controlling the propulsion system 38 of the vehicle, or for engaging the braking system 40 of the vehicle.

The location-determining receiver 10 comprises a Global Positioning System (GPS) receiver (e.g., a GPS receiver with differential correction). The location-determining receiver 10 may provide one or more of the following data types: position data (e.g., expressed as geographic coordinates), velocity data, and acceleration data. Velocity data further comprises speed data and heading data for the vehicle.

In one embodiment, the data processor 12 further comprises a boundary definer 14, an estimator 16, and an alert generator 18. The boundary definer 14 facilitates defining one or more boundaries of a work area or field. For example, the boundary definer 14 may facilitate defining an outer boundary and an inner boundary of a work area. The boundary definer 14 may automatically generate an inner boundary based on an outer boundary of the work area and the turning radius of the vehicle, operator preferences, or otherwise.

The boundary definer 14 may define the boundary of the work area by recording points along the boundary, by surveying the boundary, or by a pre-existing map of the field or work area generated from a survey (e.g., ground or aerial survey) of the work area. For instance, if the management system 11 is located on a vehicle, as an operator traverses or tracks the boundary, inner boundary, or outer boundary of a work area, the location-determining receiver 10 provides location data that records the coordinates or points of the applicable boundary for storage in the data storage device 28 as boundary data 30. The data processor 12 may later retrieve the boundary data 30 for a particular field or work area to facilitate automated turning of the vehicle and provision of operator alerts prior to execution of such automated turning of the vehicle.

The estimator 16 is configured to provide an estimate (e.g., a temporal estimate) of when the vehicle will next cross a boundary (e.g., inner boundary or outer boundary) given the observed velocity and observed heading (e.g., where acceleration is approximately zero or a negligible amount), or given the observed velocity, observed heading, and acceleration (e.g., current acceleration and estimated acceleration, which may be expressed as a curve, a differential equation or a quadratic equation). As used throughout this document, the terms observed velocity and current velocity shall be regarded as synonymous; the terms current heading and observed heading shall be regarded as synonymous; and the terms observed acceleration and current acceleration shall be regarded as synonymous.

The alert generator 18 is configured to generate an alert signal or an alert message that is triggered or initiated by the estimate being less than or equal to a threshold minimum time period. In one embodiment, an alert signal or an alert message of the alert generator 18 may be sustained or remain active after such triggering until the vehicle crosses a boundary or approaches the boundary by a predetermined temporal amount or a predetermined distance. The predetermined temporal amount or predetermined distance may be proportional to a speed or velocity of the vehicle, for example. In another embodiment, the alert generator 18 may facilitate changing the volume, intensity, amplitude, frequency or other modulation of an audible alert, a visual alert, or an audio visual alert based on the proximity of the vehicle to the boundary (e.g., inner boundary or boundary).

An operator interface 20 comprises a keyboard, a keypad, a display, a pointing device (e.g., mouse or trackball), a switch, a console, or a dashboard. In one embodiment, the operator interface 20 comprises a switch 22 and an alert device 24. The alert device 24 may comprise an audio alarm, a siren, a buzzer or another alert device for producing an audible alarm or one or more tones. In another embodiment, the alert device may comprise an audio visual device for expressing an audible and visual alert. In yet another embodiment, the alert generator 18 or the alert device 24 increases a volume, alters an amplitude, changes a pitch or frequency, or otherwise changes the modulation of the audible alert (e.g., a tone or group of tones) if the control time window expires without the operator entering the command. Similarly, if the alert device 24 comprises a display, the intensity of the display may be altered, the image may be flashed, colors may be alternated, portions of the images may be rotated or moved, or other attention-grabbing images or visual tactics may be used.

The data storage device 28 may store boundary data 30 and turn data 32. The boundary data 30 may comprise outer boundary data, inner boundary data or other boundary data that is relevant to a particular work area or field. The turn data 32 may comprise generic turns for execution by a vehicle or particular vehicle based on the characteristics of the vehicle, its associated implement, or both. The turn data 32 may comprise right turn data, left turn data, bulb-shaped turn data, row-skipping turn data, arc turn data, arched turn data, U-turn data, headland turn data, or the like.

The controller 34 may comprise a control interface that provides an interface between the data processor 12 and one or more of the following: a steering system 36, a propulsion system 38, or a braking system 40. In one example, if the steering system 36, propulsion system 38, or braking system 40 accepts an analog input, the controller 34 may comprise a memory buffer and a digital-to-analog converter. In another example, if the steering system 36, propulsion system 38, or braking system 40 accepts a digital input, a contact closure, or a logic level signal, the controller 34 may comprise a driver, a relay circuit, a logic level circuit, or a power switching circuit. In yet another example, the controller 34 sends a digital or analog control signal (e.g., steering angle commands, heading commands, or position data associated with corresponding time data) to the steering system 36 to execute an automated turn or a manually controlled turn at or near a boundary. In still another example, the controller 34 sends a digital or analog control signal to the braking system 40 if the control time window expires without the operator entering a command.

The steering system 36 may comprise an electrical steering system, a drive-by-wire steering system, an electro-hydraulic steering system, or a hydraulic steering system with an electronic control interface. An electrical steering system or a drive-by-wire steering system may comprise an electric motor or actuator that is mechanically coupled (e.g., via a rack and pinion gear coupled to a steering shaft) to rotate or steer at least one wheel of the vehicle. An electro-hydraulic steering system may control a hydraulic valve, a hydraulic cylinder or another hydraulic member via a solenoid or another electromechanical device to steer the vehicle or execute a turn.

The propulsion system 38 may comprise an internal combustion engine, the combination of an electric drive motor and motor controller, or a hybrid with both an internal combustion engine and an electric drive motor. If the propulsion system 38 is an internal combustion engine, the controller 34 may interface with a throttle controller, a fuel injection system, a carburetor, or another device for metering fuel, air, or the fuel-air mixture. If the propulsion system 38 is an electric motor, the controller 34 may interface with a motor controller, an inverter, a chopper, an alternating current source, a signal generator, a variable voltage supply, a variable current supply, or another device for controlling the operation of the motor.

The braking system 40 may comprise an electro-hydraulic braking system, an electrical braking system, or an electrically operated mechanical braking system. An electro-hydraulic braking system may control a hydraulic valve, a hydraulic cylinder or another hydraulic member via a solenoid or another electromechanical device to slow or stop the vehicle. An electrical braking system may convert mechanical rotational energy of the wheels into electrical energy through a generator or alternator associated with one or more wheels of the vehicle. An electrically operated mechanical braking system may use friction between braking members (e.g., pads and a rotor, or shoes and a drum) that is activated (e.g., via a solenoid) upon the receipt of a certain digital or analog signal.

Figure 2:
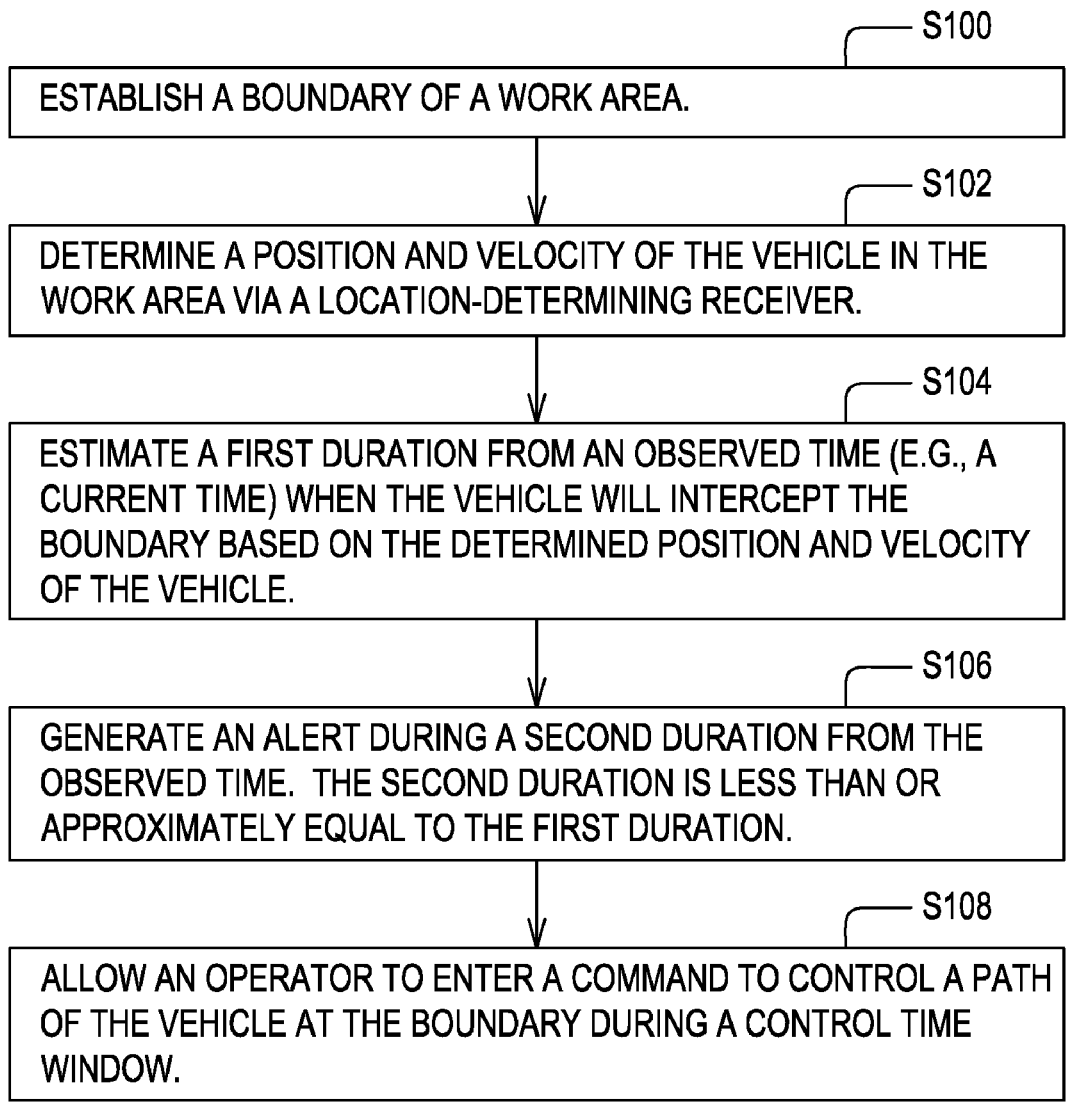
FIG. 2 is a flow chart of one embodiment of a method for managing the turning of a vehicle.

FIG. 2 illustrates a method for managing the turning of a vehicle. The method of FIG. 2 starts in step S100.

In step S100, a boundary definer 14 establishes a boundary of a work area (e.g., field). For example, a boundary definer 14 establishes an outer boundary coincident with the perimeter of a work area and an inner boundary spatially separated from the outer boundary or from one or more sides of the outer boundary. Further, in one illustrative example, the zone between the outer boundary and inner boundary may comprise a headland, where the work area is a field. The headland may represent an unplowed area at the end of a row in a field. Alternately, the headland may represent an area that is plowed, planted or harvested by making at least one pass that is generally perpendicular to the other rows in the field.

In step S102, at or prior to an observed time, a location-determining receiver 10 determines an observed position and an observed velocity of a vehicle in the work area. For example, at or prior to an observed time, the location-determining receiver 10 may determine an observed position, an observed velocity and an observed acceleration of the vehicle in the work area.

In step S104, an estimator 16 or data processor 12 estimates a first duration from an observed time (e.g., current time) when the vehicle will intercept the boundary based on the determined, observed position and observed velocity of the vehicle. For example, the estimator 16 or data processor 12 estimates a first duration from a current time when the vehicle will intercept the boundary based on the determined observed position, observed velocity and observed acceleration of the vehicle. The estimator 16 may use motion equations that assume no acceleration, nominal acceleration, a constant acceleration, or another acceleration model or representation, consistent with the vehicle, its propulsion system and the applicable task at hand. The acceleration model may define the acceleration as an acceleration versus time curve, or a quadratic equation representing the curve, or a look-up table or database representing the curve. The first duration may represent the elapsed time from the observed time to a later time where a reference point (e.g., a leading edge or front) associated with the vehicle reaches the boundary.

In step S106, an alert generator 18 or a data processor 12 generates an alert during a second duration. The second duration is less than or approximately equal the first duration. For example, the second duration may be less than the first duration by a processing time or estimation time (e.g., 100 to 300 milliseconds) associated with the data processor 12 estimating the first duration. In one embodiment, the second duration ranges between approximately 10 to approximately 30 seconds, although other duration ranges can fall within the scope of the claimed invention.

Step S106 may be carried out in accordance with various procedures that may be applied alternately or cumulatively. Under a first procedure, the alert comprises an audible alert. Under a second procedure, the alert comprises an audible and visual alert. Under a third procedure, the alert comprises movement or vibration of a seat of the operator by an actuator 322 (e.g., a linear motor, a rotary motor capable of reversible rotation, and an electro-hydraulic member, or an electrically-controlled pneumatic system).

In step S108, an operator interface 20 allows an operator to enter a command to control a path of the vehicle at the boundary during a control time window. The control time window is a period of time that is allocated for the operator's entry of a command, confirmation, or other input into the operator interface. In a first example, the duration of the control time window may be commensurate with the velocity, acceleration and proximity or position of the vehicle with respect to the nearest boundary. In a second example, the duration of the control time window may be selected based on a stopping distance of the vehicle given its velocity, position, and mean or mode stopping distance capability of its braking system 40. In a third example, the duration of the control time window may be selected based on a stopping distance of the vehicle given its velocity, position, load state (e.g., tare weight, gross weight and net weight).

Step S108 may be carried out in accordance with various techniques that may be applied alternately or cumulatively. Under a first technique, the operator interface 20 allows an operator to enter the command to confirm a preplanned or automated turn of the vehicle. Under a second technique, the operator interface 20 allows an operator to enter the command to change a direction of turn from a right turn to a left turn, or vice versa. Under a third technique, the operator interface 20 allows an operator to enter the command to skip rows, each row being commensurate with a vehicle width of the vehicle. Under a fourth technique, the operator interface 20 allows an operator to enter the command to override an automated turn by activating an override switch 22 in a cab of the vehicle. Under a fifth technique, the operator interface 20 allows an operator to manually turn a steering wheel to elect a manual turning mode of the vehicle and to disable an upcoming automated turn of the vehicle, where a torque detector detects a threshold minimum torque level. Under a sixth technique, the operator interface 20 allows an operator to manually turn a steering wheel to elect a manual turning mode of the vehicle and to disable an upcoming automated turn of the vehicle, where a rotation sensor 222 detects a minimum angular rotation of the steering wheel or its shaft. Under a seventh technique, the operator interface 20 allows an operator to enter a command to control the vehicle to make a U-turn, an arched turn, or a row skipping turn. Under an eighth technique, the operator interface 20 allows an operator to enter a command to control the vehicle to make a bulb-shaped turn. Under a ninth technique, the operator interface 20 allows an operator to simultaneously generate an alert under step S106 and to enter a command to control the vehicle under step S108.

Figure 3:
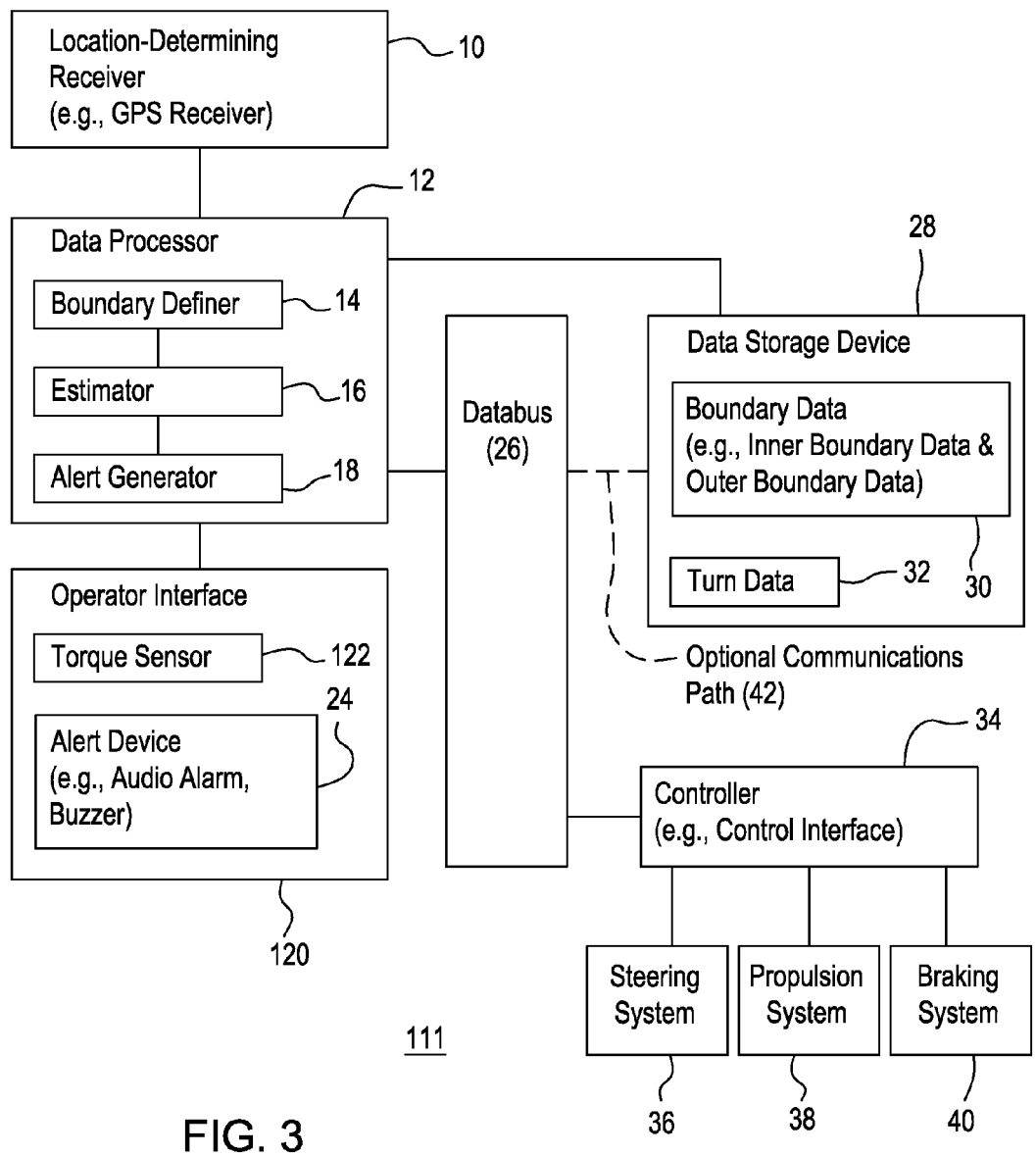
FIG. 3 is a block diagram of another embodiment of a system for managing the turning of a vehicle.

The management system 111 of FIG. 3 is similar to the management system 11 of FIG. 1, except the management system 111 of FIG. 3 replaces the switch 22 with a torque sensor 122. The operator interface 120 comprises the torque sensor 122 and an alert device 24. In one embodiment, the torque sensor 122 is associated with at least one of a steering shaft, a steering wheel, or the steering system 36 to detect whether the operator of the vehicle applies a certain minimum torque level to the steering wheel. If the operator applies a certain minimum torque level to the steering wheel, the data processor 12 or controller 34 may interrupt or seize control of steering commands generated by or executed by the controller 34 to allow an operator to manually steer the vehicle via the steering wheel. Accordingly, if the torque sensor 122 detects a certain minimum torque during a time period, the data processor 12 or controller 34 overrides an automated steering mode in favor of a manual steering mode. In the automated steering mode, the data processor 12 or the controller 34 steers the vehicle, via the steering system 36, through a turn in accordance with location data from the location-determining receiver 10 and turn data 32 that is stored in the data storage device 28 or elsewhere. In the manual steering mode, the controller 34 may allow an operator to manually steer the vehicle along a desired path, or to avoid an obstacle or take evasive action.

Figure 4:
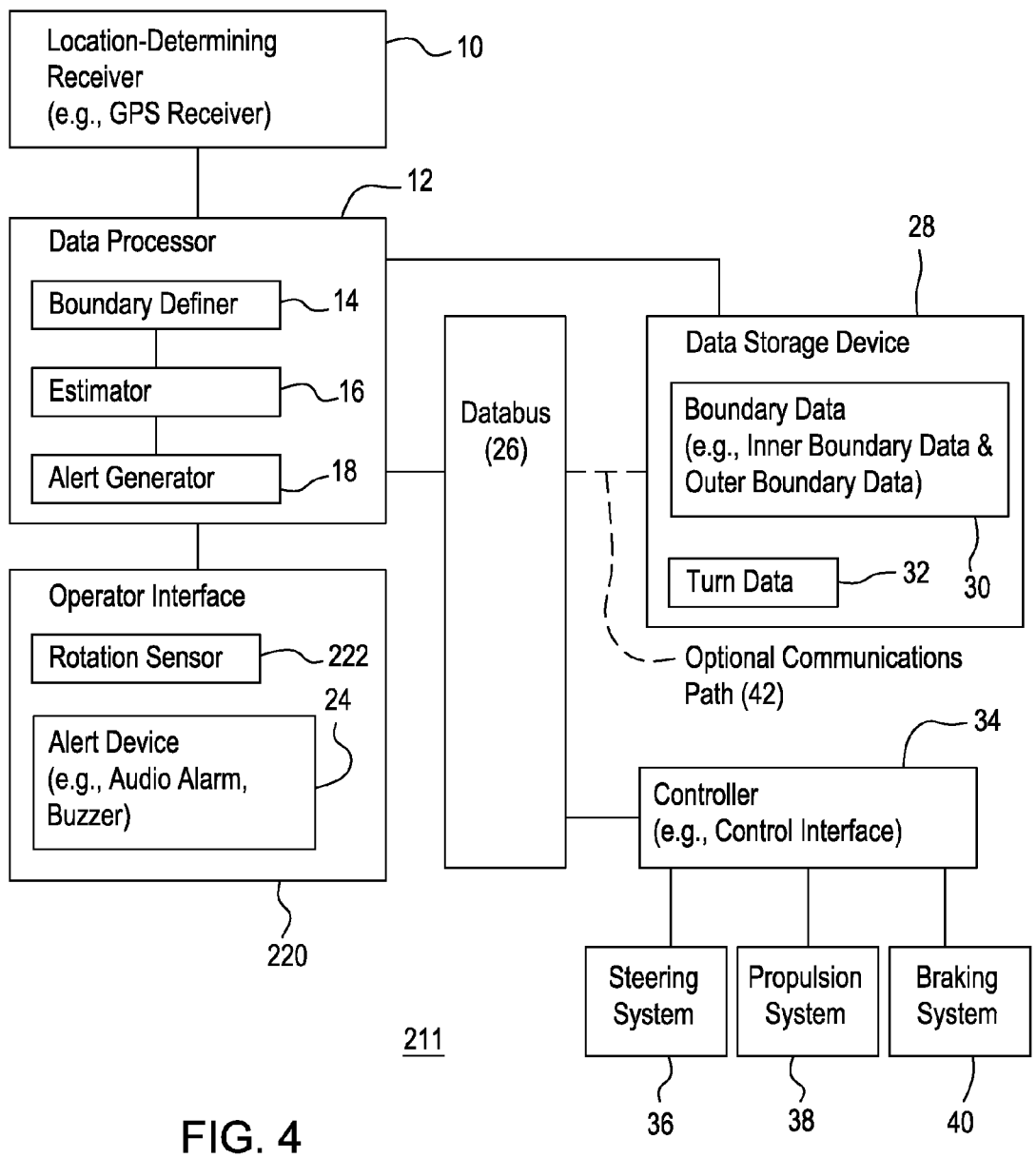
FIG. 4 is a block diagram of yet another embodiment of a system for managing the turning of a vehicle.

The management system 211 of FIG. 4 is similar to the management system 11 of FIG. 1, except the management system 211 of FIG. 4 replaces the switch 22 with a rotation sensor 222. The operator interface 220 comprises the rotation sensor 222 and the alert device 24. In one embodiment, the rotation sensor 222 is associated with at least one of a steering shaft, a steering wheel, or the steering system 36 to detect whether the operator of the vehicle applies a certain minimum angular rotation to the steering wheel. If the operator applies a certain minimum angular rotation of the steering wheel, the data processor 12 or controller 34 may interrupt or seize control of steering commands generated by or executed by the controller 34.

Figure 5:
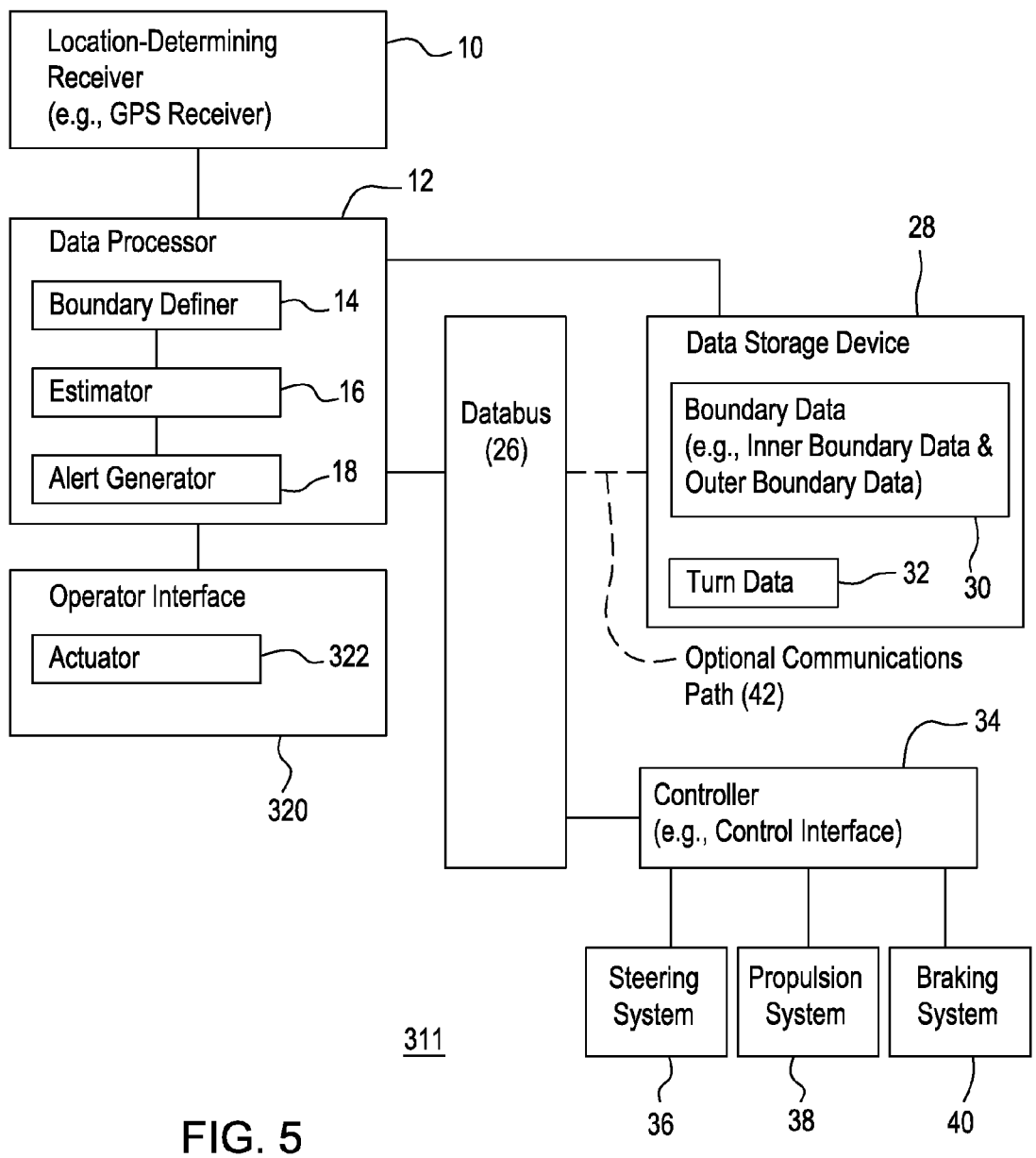
FIG. 5 is a block diagram of still another embodiment of a system for managing the turning of a vehicle.

The management system 311 of FIG. 5 is similar to the management system 11 of FIG. 1, except the management system 311 of FIG. 5 replaces the switch 22 and the alert device 24 with an actuator 322. The operator interface 320 comprises the actuator 322. In one embodiment, the actuator 322 is operably connected to a seat or a seat component (e.g., seat suspension member) of the vehicle and fixed portion (e.g., frame, structural member or supporting structure) of the vehicle. The seat may be arranged so that it is movable with respect to the fixed portion by hinges or suspension members, for example. The actuator 322 may comprise a linear motor, the combination of a pneumatically charged cylinder and an air compressor, an electro-hydraulic cylinder controlled by an electrical or electronic control signal, or a rotary motor (capable of reversal of rotational direction) coupled to a belt or chain. The alert generator 18 sends a control signal or control data to the actuator 322 for generation of an alert. In response to the control signal or control data, the actuator 322 provides vibration, shaking, or other movement of the operator seat to warn an operator of approaching of a boundary of the vehicle to the control signal or control data. The management system 311 of FIG. 5 is well suited for an operator that may be deaf, hearing impaired, inattentive, not alert, drowsy, unconscious or sleepy Thus, the actuator 322 functions as an alert device for the operator.

Figure 6:
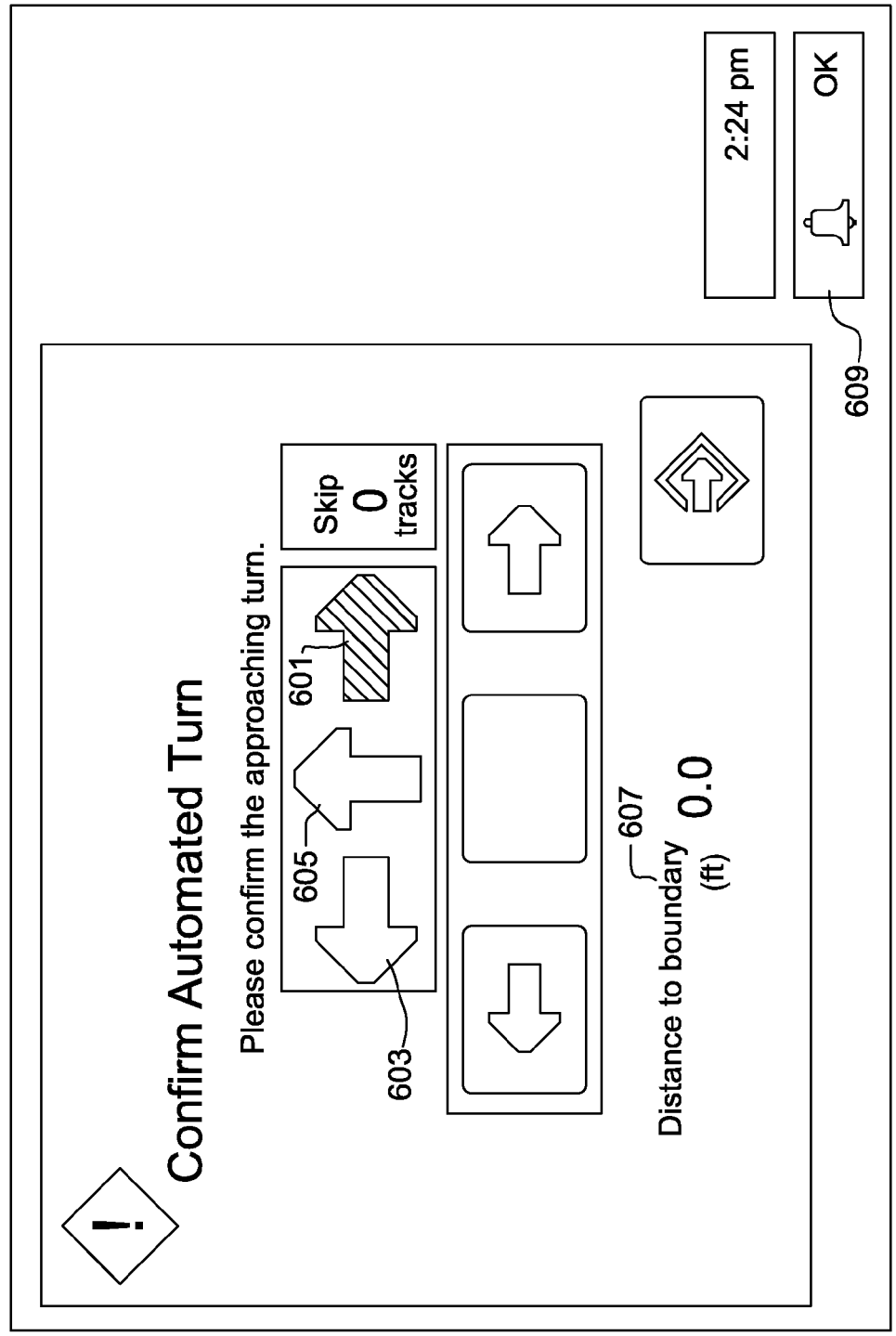
FIG. 6 is an illustration of one possible configuration of an operator interface.

FIG. 6 is an illustration of one possible configuration or display 600 of an operator interface (20, 120, 220 or 320) that supports an operator's entry of a command. In the exemplary configuration of FIG. 6, the operator may confirm the approaching turn by selecting or activating a right turn arrow 601, a left turn arrow 603, or a straight arrow 605. As indicated by the cross-hatching, the right turn arrow 601 is selected in FIG. 6 for illustrative purposes. The display 600 also provides an indication of a distance 607 between an observed position (e.g., current position) of the vehicle and the boundary or an inner boundary. The bell symbol 609 in the lower right corner indicates that an audible alert or alarm is active, or will become active upon approaching the boundary, whereas a bell symbol with a diagonal line through it may indicate that the audible alert or alarm is inactive or deactivated.

Figure 7:
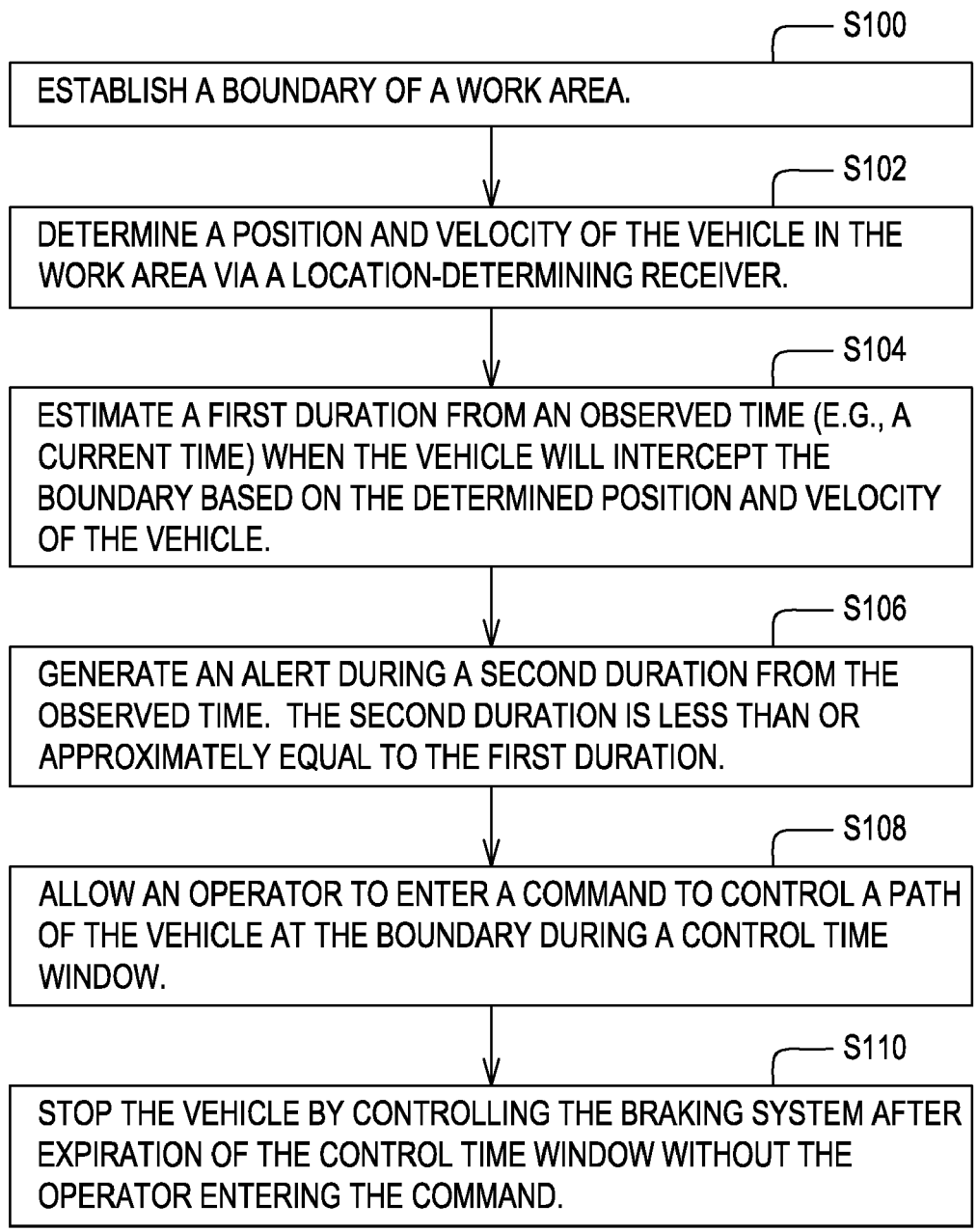
FIG. 7 is a flow chart of another embodiment of a method for managing the turning of a vehicle.

The method of FIG. 7 is similar to the method of FIG. 2, except FIG. 7 includes additional step S110. Like reference numbers in FIG. 2 and FIG. 7 indicate like steps or procedures.

Following step S108, in step S110 a controller 34 or data processor 12 stops the vehicle by controlling the braking system 40 after expiration of the control time window without the operator entering a command (e.g., to control the path of the vehicle or to confirm an automated turn of the vehicle). If the operator fails to enter a command or confirm the automated turn within the control time window, it may indicate that the operator is inattentive or not alert. Similarly, if the operator fails to enter a command to control the path of the vehicle within the control time window, it may indicate that the operator is inattentive or not alert.

Figure 8:
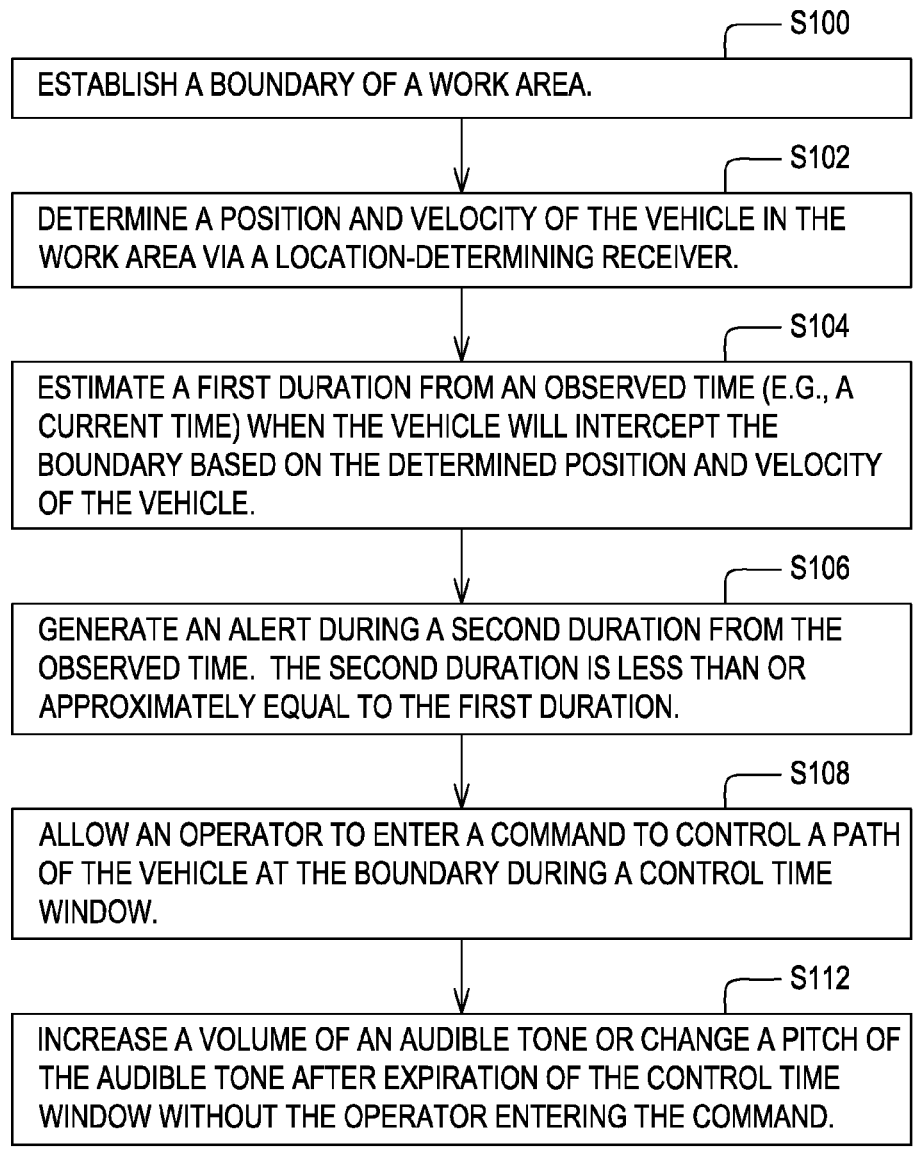
FIG. 8 is a flow chart of another embodiment of a method for managing the turning of a vehicle.

The method of FIG. 8 is similar to the method of FIG. 2, except FIG. 8 includes additional step S112. Like reference numbers in FIG. 2 and FIG. 8 indicate like steps or procedures.

Following step S108, in step S112 a data processor 12 or alert device 24 increases a volume of an audible tone, changes a pitch (e.g., frequency) or modulation of the audible tone after expiration of the control time window without the operator entering a command (e.g., to control the path of the vehicle to confirm an automated turn of the vehicle). If the operator fails to enter a command or confirm the automated turn within the control time window, it may indicate that the operator is inattentive or not alert. Similarly, if the operator fails to enter a command to control the path of the vehicle within the control time window, it may indicate that the operator is inattentive or not alert.

Figure 9:
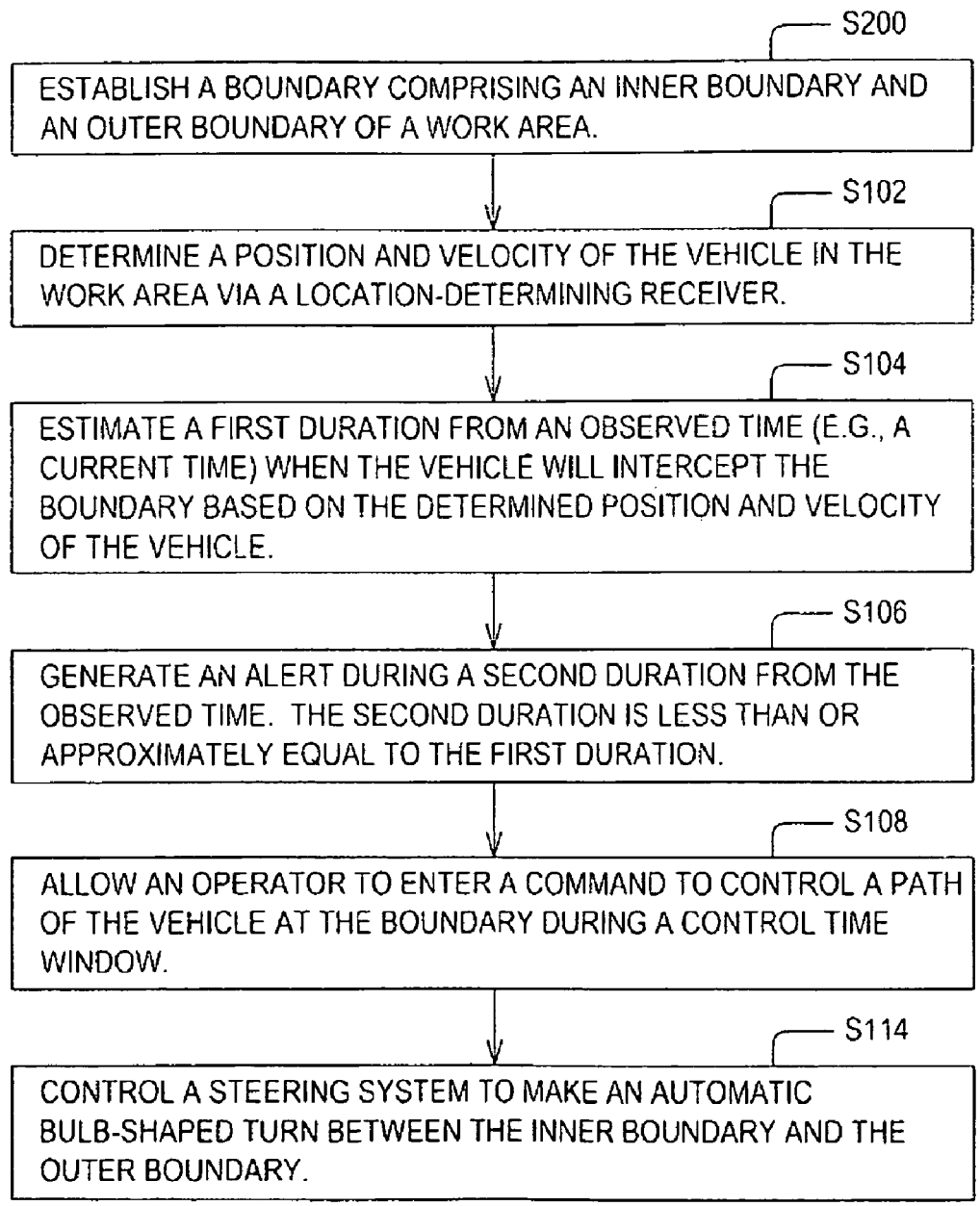
FIG. 9 is a flow chart of yet another embodiment of a method for managing the turning of a vehicle.

The method of FIG. 9 is similar to that of FIG. 2, except step S100 is replaced With step S200 and step S114 is added.

In step S200, a boundary definer 14 establishes a boundary comprising an inner boundary and an outer boundary of a work area. For example, the zone or area between the inner boundary and the outer boundary may define a headland.

In step S102, a location-determining receiver 10 determines a position and velocity of a vehicle in the work area. For example, the location-determining receiver 10 may determine an observed position, an observed velocity and an observed acceleration of the vehicle in the work area.

In step S104, an estimator 16 or data processor 12 estimates a first duration from an observed time (e.g., a current time) when the vehicle will intercept the boundary based on the determined observed position and velocity of the vehicle. For example, the estimator 16 or data processor 12 estimates a first duration from an observed time when the vehicle will intercept the boundary based on the determined position, velocity and acceleration of the vehicle.

In step S106, an alert generator 18 or a data processor 12 generates an alert during a second duration from the observed time. The second duration is less than or approximately equal the first duration. For example, the second duration may be less than the first duration by a processing time or estimation time (e.g., 100 to 300 milliseconds) associated with the data processor 12 estimating the first duration. In one embodiment, the second duration ranges between approximately 10 to approximately 30 seconds, although other duration ranges can fall within the scope of the claimed invention.

Step S106 may be carried out in accordance with various procedures that may be applied alternately or cumulatively. Under a first procedure, the alert comprises an audible alert. Under a second procedure, the alert comprises an audible and visual alert. Under a third procedure, the alert comprises movement or vibration of a seat of the operator by an actuator 322 (e.g., a linear motor, a rotary motor capable of reversible rotation, and an electro-hydraulic member, or an electrically-controlled pneumatic system).

In step S108, an operator interface 20 allows an operator to enter a command to control a path of the vehicle at the boundary during a control time window. The other aspects of step S108 that are set forth in the description of FIG. 2 apply equally here as if fully set forth in conjunction with FIG. 9.

In step S114, the data processor 12 or controller 34 controls the steering system 36 to make an automatic bulb-shaped turn or a row-skipping turn between the inner boundary and the outer boundary. For example, the data processor 12 or controller 34 controls the steering system 36 to execute an automatic bulb-shaped turn in the headland or a row-skipping turn in the headland.

Figure 10:
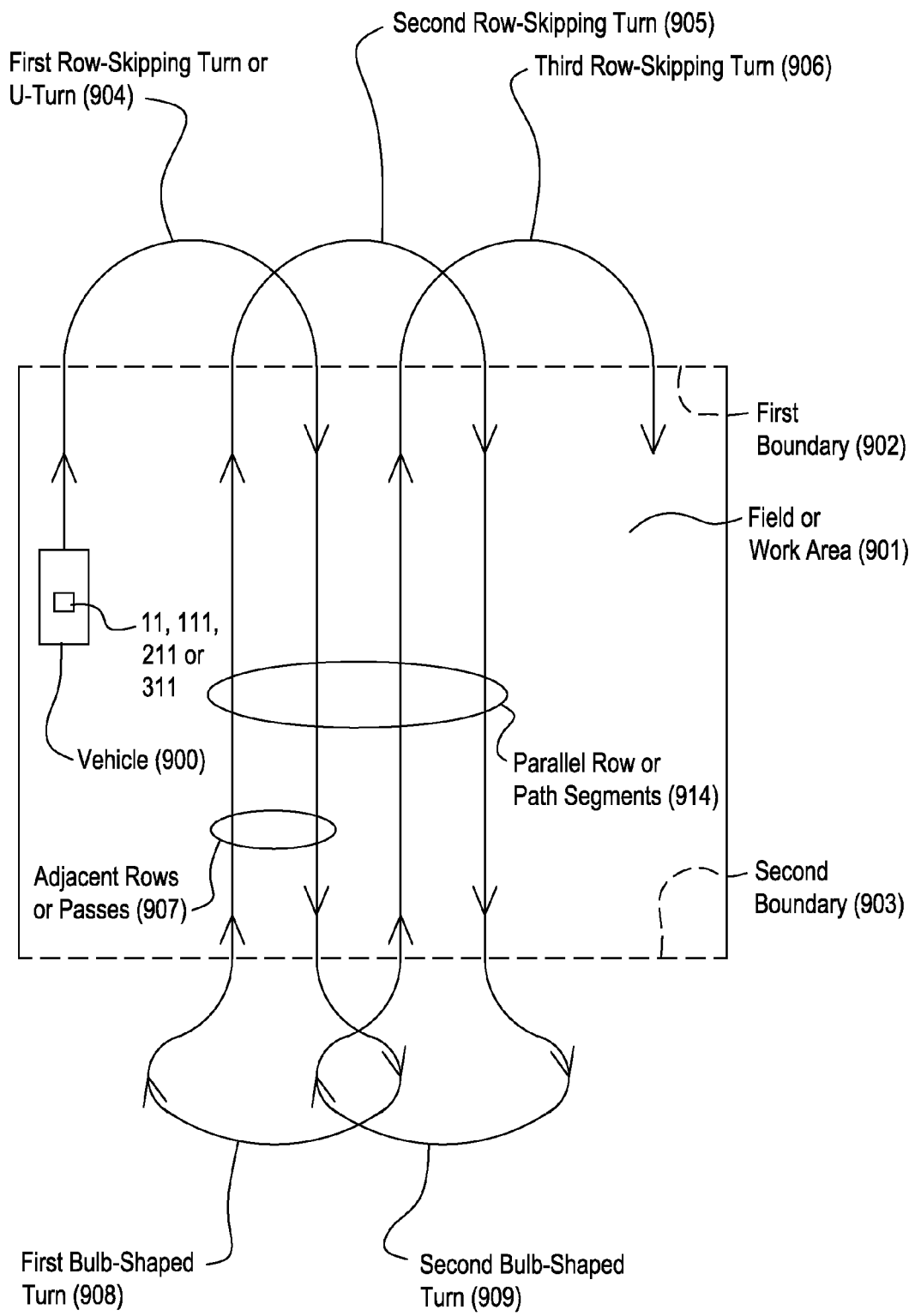
FIG. 10 is a diagram of a vehicle executing illustrative turns at or near a boundary.

FIG. 10 is a diagram of a vehicle 900 executing illustrative turns at or near a boundary. A vehicle 900 is equipped with any of the systems (11, 111, 211, or 311) described herein. The vehicle 900 operates in a field or work area 901 that is bounded by a first boundary 902 and a second boundary 903. As illustrated in FIG. 10, turns are executed outside of the first boundary 902 or the second boundary 903 at the ends of the rows or passes of the vehicle 900. The arrows indicate the illustrative direction of travel of the path of the vehicle 900. Although other paths are possible and fall within the scope of the claims, the illustrative example of FIG. 10 shows the vehicle 900 travels toward the first boundary 902 (e.g., in an upward direction on the sheet) to make a first row-skipping turn 904 upon or after reaching the first boundary 902. The vehicle 900 then travels toward the second boundary 903 (e.g., in a downward direction on the sheet) where the vehicle 900 makes a first bulb-shaped turn 908 such that adjacent rows 907 are covered by the vehicle 900 within minimal overlap (e.g., or a target overlap) of an implement (e.g., cutter, mower, plow, planter, sprayer, scraper, harvester, or combine) associated with the vehicle 900.

Upon or after the vehicle 900 reaches the first boundary 902, the vehicle 900 executes a second row-skipping turn 905 such that the vehicle 900 travels toward the second boundary 903 (e.g., in a downward direction on the sheet) after the turn. Upon or after the vehicle 900 reaches the second boundary 903, the vehicle 900 executes a second bulb-shaped turn 909 to facilitate coverage of multiple adjacent parallel rows 914.

Next, the vehicle 900 progresses toward the first boundary 902 where the vehicle executes a third row-skipping turn 906. Prior to execution of any of the foregoing turns, the operator has an opportunity to enter a command to execute a desired automated turn, a modification of a pre-programmed automated turn, or manual turn, as previously described in this document and the accompanying drawings.

Figure 11:
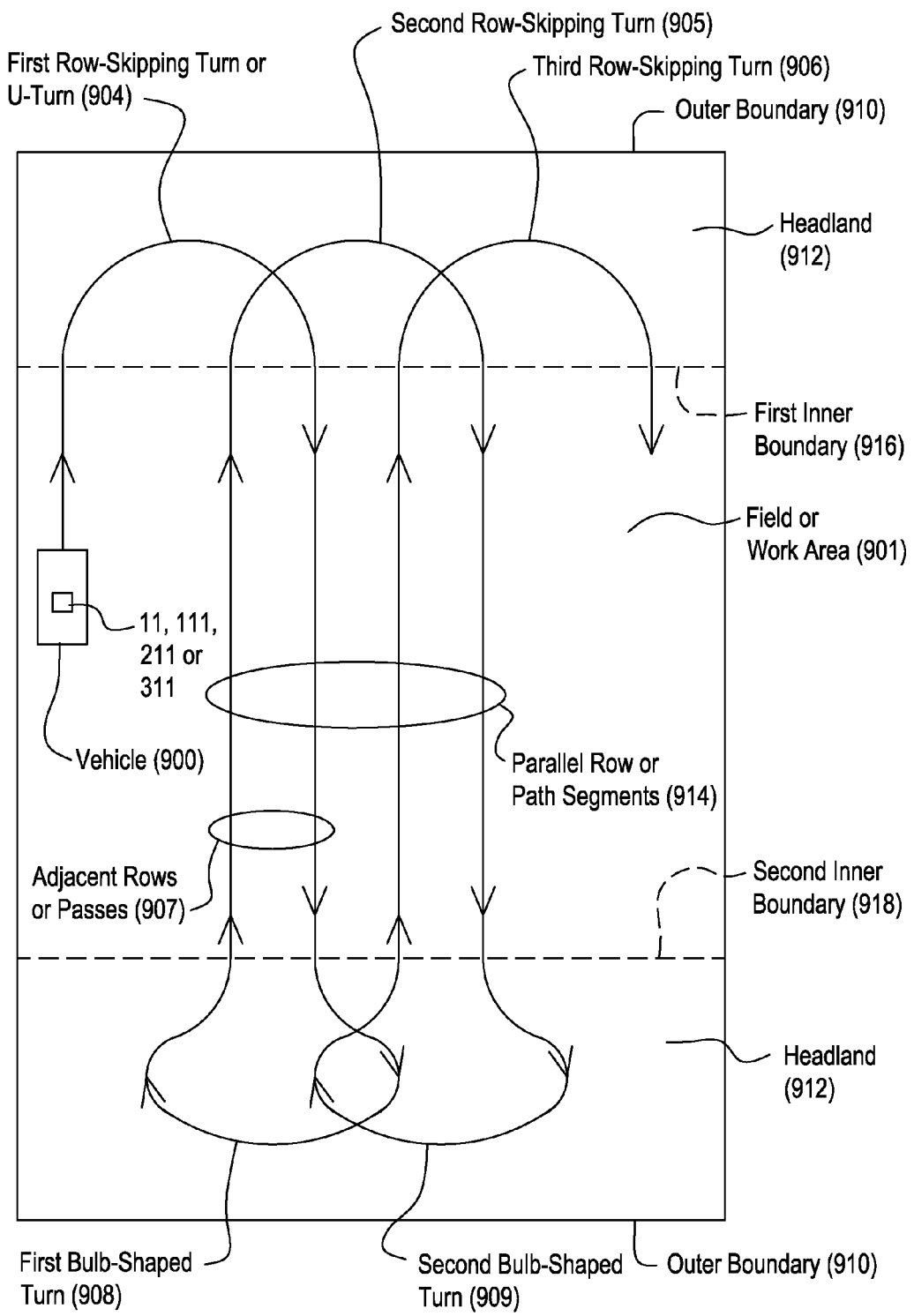
FIG. 11 is a diagram of a vehicle executing illustrative turns at or near an inner boundary within a headland.

FIG. 11 is a diagram of a vehicle 900 executing illustrative turns between an inner boundary and an outer boundary 910, or between headlands 912. A vehicle 900 is equipped with any of the systems (11, 111, 211, or 311) described herein. The vehicle 900 operates in a field or work area 901 that is bounded by a first inner boundary 916 and a second inner boundary 918. Further, a headland 912 is defined by a first zone between the first inner boundary 916 and an outer boundary 910, and by a second zone between a second inner boundary 918 and an outer boundary 910. As illustrated in FIG. 11, turns are executed in the headlands 912 at the ends of the rows or passes of the vehicle 900. Accordingly, in accordance with FIG. 11 the vehicle 900 and its associated implement, with their respective minimum turning radii operate entirely within the headland without crossing the outer boundary 910.

The arrows indicate the illustrative direction of travel of the path of the vehicle 900. Although other paths are possible and fall within the scope of the claims, the illustrative example of FIG. 11 shows the vehicle 900 travels toward the first inner boundary 916 (e.g., in an upward direction on the sheet) to make a first row-skipping turn 904 upon or after reaching the first inner boundary 916. The vehicle 900 then travels toward the second inner boundary 918 (e.g., in a downward direction on the sheet) where the vehicle 900 makes a first bulb-shaped turn 908 such that adjacent rows 907 are covered by the vehicle 900 within minimal overlap of an implement (e.g., cutter, mower, plow, planter, sprayer, scraper, harvester, or combine) associated with the vehicle 900.

Upon or after the vehicle 900 reaches the first inner boundary 916, the vehicle 900 executes a second row-skipping turn 905 such that the vehicle 900 is traveling toward the second inner boundary 918 (in a downward direction) on the sheet after the turn. Upon or after the vehicle 900 reaches the second inner boundary 918, the vehicle 900 executes a second bulb-shaped turn 909 to facilitate coverage of multiple adjacent parallel rows 914. Next, the vehicle 900 progresses toward the first inner boundary 916 to execute a third row-skipping turn 906. In one embodiment, all of the turns shown in FIG. 11 are made within the confines of the headland 912 and do not go beyond the outer boundary 910. Prior to execution of any of the foregoing turns, the operator has an opportunity to enter a command to execute a desired automated turn, a modified automated turn, or manual turn, as previously described in this document and the accompanying drawings.

Having described the preferred embodiment, it will become apparent that various modifications can be made without departing from the scope of the invention as defined in the accompanying claims.

The invention claimed is:

1. A method for controlling the operation of a vehicle, the method comprising:
    establishing a boundary of a work area; determining an observed position and observed velocity of the vehicle in the work area via a location-determining receiver;
    estimating a first duration from an observed time when the vehicle will intercept the boundary based on the determined position and velocity of the vehicle;
    generating an alert during a second duration from the observed time, the second duration less than or approximately equal to the first duration; and
    allowing an operator to enter a command to control a path of the vehicle at the boundary during a control time window, where the duration of the control time window is commensurate with the velocity, acceleration and proximity or position of the vehicle with respect to a nearest boundary of the work area.

2. The method according to claim 1 wherein the allowing comprises allowing the operator to enter the command to confirm a preplanned or automated turn of the vehicle.

3. The method according to claim 1 wherein the allowing comprises allowing the operator to enter the command to change a direction of turn from a right turn to a left turn, or vice versa.

4. The method according to claim 1 wherein the allowing comprises allowing the operator to enter the command to skip a row while executing a turn, each row being commensurate with a vehicle width of the vehicle.

5. The method according to claim 1 wherein the allowing comprises allowing the operator to enter the command to override an automated turn by activating an override switch in a cab of the vehicle.

6. The method according to claim 1 wherein the allowing comprises allowing the operator to manually turn a steering wheel to elect a manual turning mode of the vehicle and to disable an upcoming automated turn of the vehicle, where a torque detector detects a threshold minimum torque level.

7. The method according to claim 1 wherein the allowing comprises allowing the operator to manually turn a steering wheel to elect a manual turning mode of the vehicle and to disable an upcoming automated turn of the vehicle, where a rotation sensor detects a minimum angular rotation of the steering wheel or its shaft.

8. The method according claim 1 wherein the second duration ranges between approximately 10 to approximately 30 seconds.

9. The method according to claim 1 wherein after an expiration of the control time window without interaction from the operator, the vehicle is stopped.

10. The method according to claim 1 wherein after an expiration of the control time window without interaction from the operator, an audible alert increases in volume, changes its pitch, or alters its modulation.

11. The method according to claim 1 wherein the allowing further comprises allowing the operator to enter a command to control the vehicle to make a U-turn.

12. The method according to claim 1 wherein the allowing further comprises allowing the operator to enter a command to control the vehicle to make a bulb-shaped turn.

13. The method according to claim 1 wherein the boundary comprises an inner boundary and an outer boundary that defines a headland, and the vehicle is controlled to make an automatic bulb-shaped turn in the headland.

14. The method according to claim 1 wherein the alert comprises an audible alert.

15. The method according to claim 1 wherein the alert comprises an audible and visual alert.

16. The method according to claim 1 wherein the alert comprises movement of a seat of the operator by an actuator.

17. The method according to claim 1 wherein the duration of the control time window is selected based on a stopping distance of the vehicle given its velocity, position, and load state.

18. The method according to claim 1 wherein the duration of the control time window is selected based on a stopping distance of the vehicle given its velocity, position, and weight.

19. The method according to claim 1 wherein the duration of the control time window is selected based on a stopping distance of the vehicle given its velocity, position, and mean or mode stopping distance capability of its braking system.

* * * * *

UNITED STATES PATENT AND TRADEMARK OFFICE
CERTIFICATE OF CORRECTION

| | | |
|---|---|---|
| PATENT NO. | : 8,131,432 B2 | Page 1 of 1 |
| APPLICATION NO. | : 12/038040 | |
| DATED | : March 6, 2012 | |
| INVENTOR(S) | : Aaron Matthew Senneff et al. | |

It is certified that error appears in the above-identified patent and that said Letters Patent is hereby corrected as shown below:

Title Page, item 56, Col. 2, In References Cited, U.S. Patent Document 5,991,894 should be 5,991,694

Signed and Sealed this

Seventeenth Day of July, 2012

David J. Kappos
*Director of the United States Patent and Trademark Office*